April 17, 1934.  J. COYLE  1,955,670
MACHINE FOR COATING THE CHANNEL OF AN IRREGULARLY SHAPED CAN END
Filed Nov. 23, 1931   3 Sheets-Sheet 1

Inventor:
John Coyle,
By Sturtevant, Mason & Porter
Attys.

April 17, 1934.  J. COYLE  1,955,670
MACHINE FOR COATING THE CHANNEL OF AN IRREGULARLY SHAPED CAN END
Filed Nov. 23, 1931   3 Sheets-Sheet 2

Inventor:
John Coyle,
By Sturtevant, Mason & Porter
Attys.

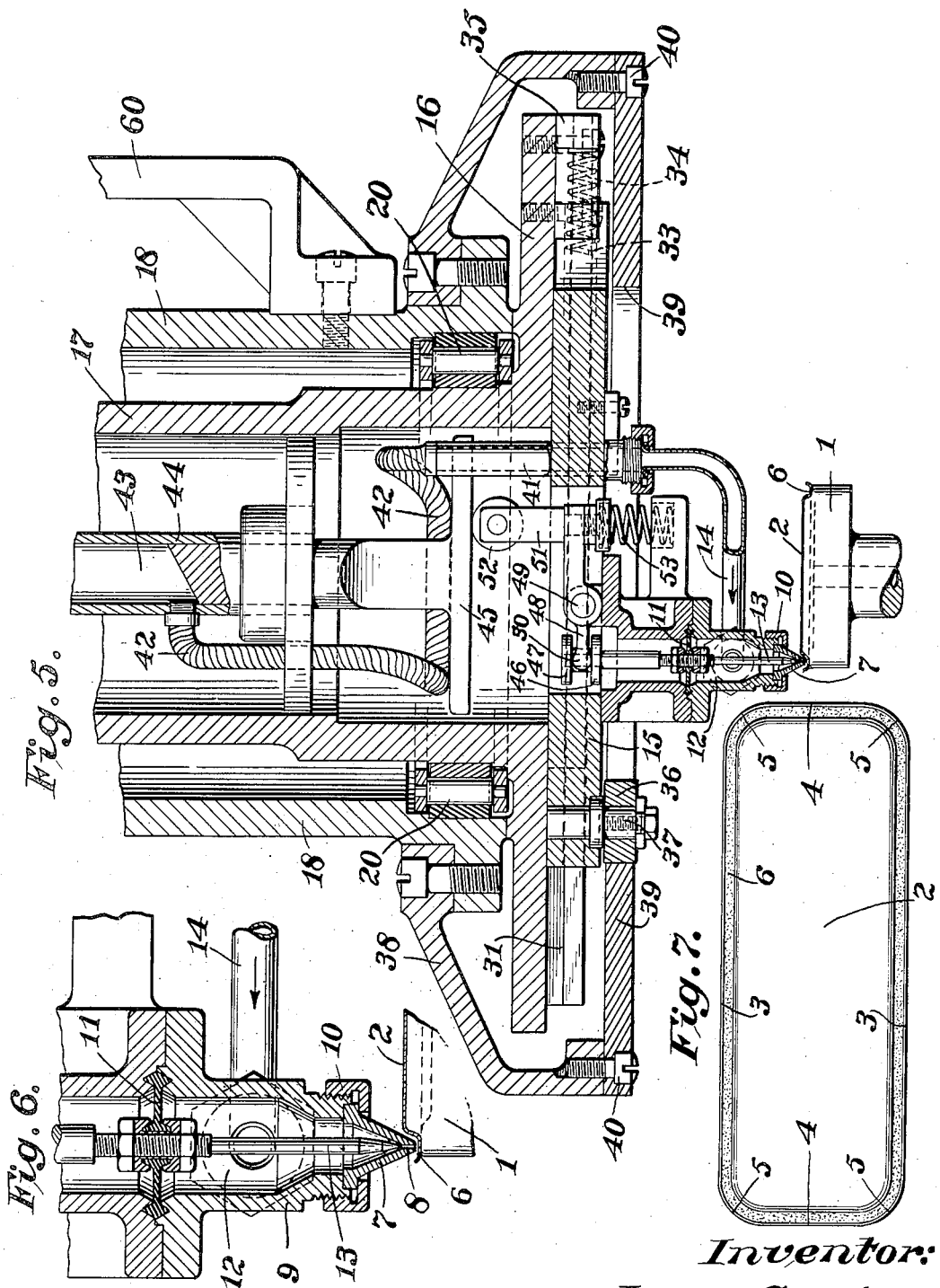

Patented Apr. 17, 1934

1,955,670

UNITED STATES PATENT OFFICE 1,955,670

MACHINE FOR COATING THE CHANNEL OF AN IRREGULARLY SHAPED CAN END

John Coyle, Baltimore, Md., assignor to Continental Can Company, Inc., New York, N. Y., a corporation of New York Application November 23, 1931, Serial No. 576,867

8 Claims. (Cl. 113—80)

The present invention relates to new and useful improvements in a machine for coating the channel of irregularly shaped can ends.

An object of the invention is to provide a machine of the above type wherein the end stands still and the nozzle is caused to travel over the channel in the end, and wherein said nozzle is controlled in its movements by a cam of larger dimensions than the channel in the can end.

A further object of the invention is to provide a machine of the above type wherein the nozzle is mounted for radial movement on a rotating head and is yieldingly forced outward by springs and moved inward by a control cam of larger dimensions than the channel in the end.

A still further object of the invention is to provide a machine of the above type wherein there is a means associated with the rotating head for controlling the flow of the coating material from the nozzle.

These and other objects will in part be obvious and will in part be hereinafter more fully disclosed.

In the drawings:—

Fig. 5 is an enlarged vertical sectional view through the lower portion of the head.

Fig. 6 is an enlarged sectional view through the nozzle and showing the valve for controlling the same.

Fig. 7 is a plan view of a can end coated on the machine with a control cam such as shown therein.

Figure 1:
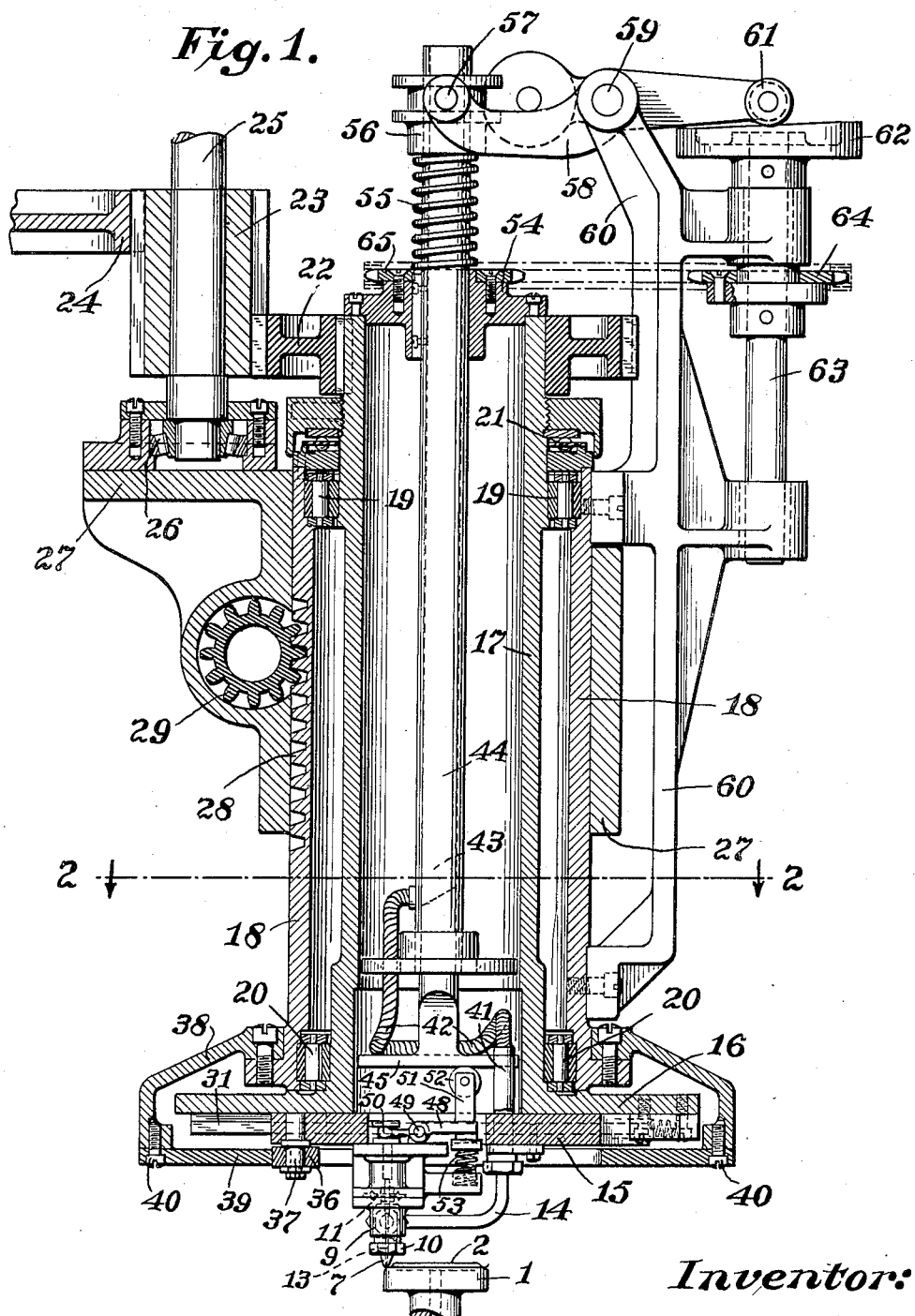
Figure 1 is a vertical sectional view through the particular parts of the machine which embody the present invention.

The invention is directed to a machine for coating the channel of irregularly shaped can ends. The can end is placed on a chuck which is non-rotating. The chuck is raised and lowered to present the can end to the nozzle for coating. The nozzle is carried by a rotating head. The head rotates continuously and the nozzle is caused to travel over the channel of the end following the irregularly shaped channel so as to deposit a coating material therein. The nozzle is mounted in a slide or cross head which is in turn mounted for radial movement on the rotating head. Springs bearing on the slide are continually urging the sleeve so as to move the nozzle outward away from the axis of rotation of the head. There is a stationary control cam associated with the head and a roller carried by the slide bears against the cam and it is this cam which positions the nozzle over the channel for each increment of angular movement of the rotating head. The perimeter or circumference of the control cam is much larger than the perimeter or circumference of the end being coated, and therefore the shaping of the control cam is different from the shaping of the channel in the end. Even though the end has rounded corners of a relatively small radius, the cam has a control surface which is free from sharp turns or angular movements so that the roller will make continuous contact with the cam and thus insure a proper positioning of the nozzle when rounding the corner on the end. The nozzle is provided with a needle valve which controls the flow of the coating material from the nozzle. This needle valve is in turn controlled by a lever bearing on a plate which is of sufficient dimensions so that the lever contacts therewith during the entire rotation of the head, although the plate has no rotating movement. This plate is moved up and down by a control cam and thus the needle valve is shifted for opening and closing the nozzle.

Referring more in detail to the drawings, the parts of the machine which are essential to illustrate the invention have been shown. The machine includes the usual supporting frame on which is mounted a chuck 1. The can end to be coated is placed on this chuck with the channel facing upward. In the drawings the can end 2 is shown having relatively long parallel side edges 3, 3, and also parallel end edges 4, 4. Between the side edges and end edges are rounded corners 5. These rounded corners are necessarily of a relatively small radius. The outer extremity of the edge is curled to aid in the double seaming and this provides a channel 6 in which the coating material is placed. The end is placed on the chuck 1 and then the chuck is raised to a position for coating. The mechanism for loading the end on the chuck and for raising and lowering the chuck may be of any well known type and has not been shown in the drawings.

The coating material is applied to the channel in the can end by a nozzle 7. This nozzle is cone shaped and is provided with a discharge passage 8 at the lower end thereof. The nozzle is secured to a chambered member 9 by means of a threaded retaining collar 10. The chamber 9 is made in two sections, and clamped between the two sections is a flexible diaphragm 11 which forms an enclosed chamber 12 at the lower part of the member. A needle valve 13 is attached to this diaphragm and controls the passage 8. The coating material is supplied to the chamber 12 by a flexible pipe 14.

The member carrying the nozzle is attached to a sliding cross head 15. This sliding cross head 15 is carried by a supporting head 16 attached to the lower end of a sleeve 17 mounted for rotation in a stationary sleeve 18. There are roller bearings 19 and 20 between the rotating head and the stationary sleeve. These roller bearings prevent lateral movement of the rotating head. There are also ball bearings 21 for supporting the head in the stationary sleeve. Attached to the rotating head is a driving gear 22 which meshes with a pinion 23 which in turn meshes with an actuating gear 24. The pinion 23 is mounted on a stub shaft 25. The stub shaft 25 is supported by a roller bearing 26 carried by the frame 27 of the machine. The sleeve 18 is mounted in the frame of the machine for endwise movement, but it does not rotate. The sleeve 18 is provided with a rack 28 and a pinion 29 meshes therewith. This pinion may be turned by hand for quickly shifting the sleeve 18 in the frame for rendering the parts accessible for cleaning. During the operation of coating the sleeve 18 remains in a fixed or stationary position.

Figure 4:
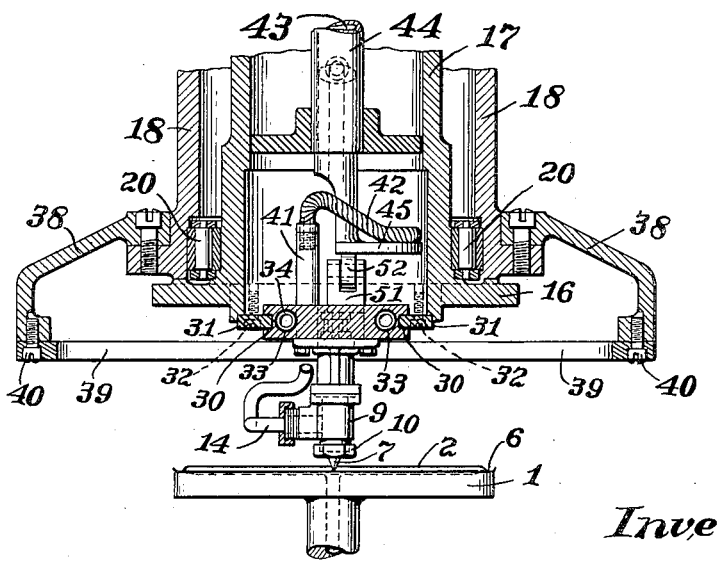
Fig. 4 is a vertical sectional view through the rotating head.

The slide 15, as shown in Fig. 4, is formed with grooves 30, 30. Attached to the head are guide rails 31, 31 which extend into these grooves 30, 30 and serve as supporting means for the slide carrying the nozzle. These guide rails are secured to the head by bolts 32, 32. The slide supporting the nozzle is therefore so mounted on the head that the nozzle may be moved radially of the axis of rotation of the head. The slide 15 is provided with recesses 33, 33, one at each side of the slide. Located in these recesses are coil springs 34, 34. The coil springs bear against a bar 35 as an abutment, and are normally pressing on the slide to move the slide away from the abutment, or to the left as viewed in Fig. 5. The end of the slide 15 is cut away to receive the bar 35 so that said sliding member or cross head 15 has a wide range of movement on the rotating head 16. Attached to the sliding member or cross head 15 is a roller 36. This roller is mounted on a stud 37 fixed to the slide. The supporting frame of the machine carries an outwardly extending bracket 38, to the lower face of which is attached a control cam 39. The control cam is in the form of a plate which is fixed to the bracket 38 by bolts 40. Said plate has an opening therethrough and the edge of the opening is shaped to form the control cam. This control cam is stationary and the roller 36 bears against the inner face of the cam. This control cam limits the movement of the cross head or sliding member 15 and determines the position of the nozzle on the rotating head.

Figure 2:
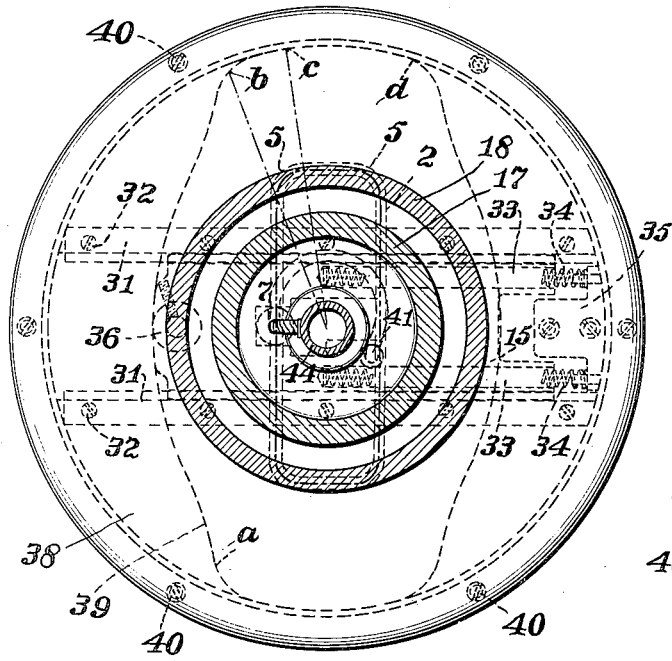
Fig. 2 is a sectional view on the line 2—2 of Fig. 1 and showing in broken lines, the shaping of the control cam, the position of the movable cross head, and in outline a can end to be coated.
Figure 3:
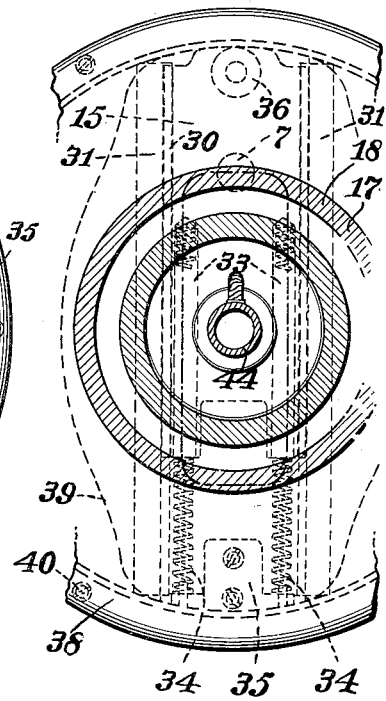
Fig. 3 is a similar view but showing the head as rotated through an angle of 90 degrees.

The shaping of the control cam 39 is indicated in Figs. 2 and 3 of the drawings. When the head rotates the roller 36 travels along the face of the cam. When the roller is moving from the point $a$ (Fig. 2) to the point $b$, the long side of the can end is being coated. The cam is so shaped as to maintain the nozzle over the channel during this angular movement of the head. When the roller is moving from the point $b$ to the point $c$ on the control cam, then the nozzle is passing around the rounded corner to the end section of the channel. During this travel of the roller the angular change in its movement is much more gradual than the angular change in the movement of the nozzle. This is due to the fact that the circumference of the control cam is considerably greater than the perimeter of the end being coated. It will be noted that the curve in the cam from $b$ to $c$ is such that the roller even though traveling at a rapid rate will maintain its contact therewith without jumping and there is little wear incident to the travel of the roller over this curved section of the cam. When the roller is traveling from the point $c$ to the point $d$ the channel along the short side of the end is being coated.

Inasmuch as the springs 34 are continually urging the sliding member or cross head 15 outwardly, the roller is held firmly in contact with the control cam. As a result the nozzle will be positioned directly over the channel for each increment of angular movement of the rotating head. When the machine is to be used in connection with a different shaped end all that is necessary is to remove the control cam and replace it with a cam which is properly shaped to position the nozzle continuously over the channel in the end being coated. This control cam may be readily removed and another substituted therefor. The machine is therefore very easily adjustable for different shapes and different sizes of can ends.

In Figs. 2 and 3 the can end being coated is indicated by the broken line 2. The nozzle is indicated by the circle 7 and the roller is indicated at 36. The rouded corner of the can end is indicated at 5.

The pipe 14 for supplying coating material is connected to a vertical pipe 41 mounted in the sliding member or cross head 15. A flexible pipe 42 is attached to the upper end of the pipe 41 and is connected to a chamber 43 formed in a sleeve 44 carrying a control plate 45 operating to regulate the flow of the coating material through the nozzle. At the upper end of the needle valve 13 there are spaced collars 46 and 47. A lever 48 is pivoted at 49 on the cross head 15. The lever has a projecting arm provided with a ball head 50 which rests between the rollers 46 and 47. The lever also carries an upwardly projecting arm 51 in which is mounted a roller 52 adapted to engage the under face of the control plate 45. A spring 53 bearing on the outer end of the lever 48 holds the roller 52 in contact with the control plate 45. The sleeve 44 carrying the control plate extends upwardly and out through the upper end of the rotating sleeve 17. Said rotating sleeve is provided with a closing head 54 and the sleeve extends through this head and is splined thereto so that it rotates with the head but is free to move endwise in the head. There is a spring 55 surrounding the sleeve and bearing at its lower end against the head 54 and at its upper end against a collar 56 which is fixed to the sleeve. This collar has spaced members between which extend pins 57 carried by a lever 58. The lever is pivoted at 59 to a bracket 60 attached to the frame of the machine. At its outer end the lever is provided with a roller 61 which bears against a control cam 62 mounted on a shaft 63. The shaft 63 carries a sprocket wheel 64. A sprocket chain runs over this sprocket wheel 64 and over a sprocket wheel 65 which is bolted to the head 54. As the head rotates the sprocket chain will impart rotation to the shaft 63 in timing therewith. The control cam 62 has its face shaped so as to lift the needle valve to permit the coating material to flow from the nozzle when the end is positioned and the machine operated for coating the end. It will release the needle valve so that it is closed when the coating of the end has been completed. This is accomplished by reason of the fact that the control cam positions the control plate 45, and this plate bearing on the roller 52 will cause the needle valve to be raised and lowered. When the plate is depressed then the needle valve is lifted and the nozzle is open for coating. When the plate is raised then the spring 53 will move the needle valve downward and close the passage in the nozzle through which the coating material is discharged. The spring 55 holds the roller 61 in contact with the face of the cam 62 and will lift the control plate 45 when released by the cam 62.

From the above it will be apparent that a machine has been provided for coating can ends of irregular shape which is very simple in construction and readily adjustable for ends of different shape and also ends of different sizes. The control cam which controls the position of the nozzle over the channel is the only element which it is necessary to change so far as the position of the nozzle is concerned. This control cam may be readily removed and another substituted therefor. The machine is very efficient in its operation as the control cam is of larger dimensions than the can end. When the can end has relatively small rounded corners which must be coated the nozzle will be caused to follow with accuracy the curvature thereof by the control cam. At this time the roller is passing along a surface in the control cam where the changes in the angular movement of the roller are very gradual compared with the changes in the angular movement of the nozzle in passing around the corner of the end. The roller furthermore is pressed against the control cam by compression springs which may be of proper tension for firmly holding the roller in contact with the control cam so that it will not jump in changing its angular motion and therefore the nozzle will always be maintained over the channel. This is very important for the reason that if any of the coating material is thrown onto the outer end of the curved edge of the end it is likely to be taken up by the seaming roll and accumulating on the seaming roll will form imperfections in the double seam.

The can end shown and described is what is usually referred to as a "square can end". It will be understood, of course, that the can end may be elliptical or any other irregular shape, that is, shape which is not concentric and wherein it is necessary to move the nozzle radially of the rotating head in order to maintain it over the channel. The can end as shown is curled at its outer edge so as to form a distinct channel. It may, however, be straight to the outer edge and still provide a channel surface which is to be coated. While the control cam is shown with its center at the center of the rotating head, it will be understood that it may be otherwise disposed.

It is obvious, therefore, that changes in the details of construction and the arrangement of the parts may be made without departing from the spirit of the invention as set forth in the appended claims.

Having thus fully described my invention, what I claim as new and desire to secure by Letters Patent, is:—

1. A machine for coating the channel of irregularly shaped can ends comprising a non-rotating can end support, a rotating head located above said support, a nozzle support mounted on said head and movable radially thereof, a cam of larger dimensions than the path of travel of the nozzle, means carried by said support for the nozzle and contacting with said cam for positioning said support and maintaining the nozzle over the channel in the end during the entire rotation of the head.

2. A machine for coating the channel of irregularly shaped can ends comprising a non-rotating can end support, a rotating head located above said support, a nozzle supported by said head for supplying coating to the channel in the end, and means for moving the nozzle radially of the head including a slide on which said nozzle is mounted carried by the rotating head and moving the nozzle radially thereof, and a cam of larger dimensions than the path of travel of the nozzle operating to position said slide and maintaining the nozzle over the channel during the entire rotation of the head.

3. A machine for coating the channel of irregularly shaped can ends comprising a non-rotating can end support, a rotating head located above said support, a nozzle supported by said head for supplying coating to the channel in the end, a slide carried by said head on which said nozzle is mounted, a plate having an opening therethrough with the edge of the opening shaped to form a control cam, a roller carried by said slide and contacting with said control cam, and springs moving said slide for holding the roller in contact with said cam.

4. A machine for coating the channel of irregularly shaped can ends comprising a non-rotating can end support, a rotating head located above said support, a nozzle supported by said head for supplying coating to the channel in the end, a slide on which said nozzle is mounted carried by the rotating head and moving the nozzle radially thereof, a cam of larger dimensions than the path of travel of the nozzle operating to position said slide and maintaining the nozzle over the channel during the entire rotation of the head, and a valve control means for regulating the discharge of the coating material from the nozzle.

5. A machine for coating the channel of irregularly shaped can ends comprising a non-rotating can end support, a rotating head located above said support, a nozzle supported by said head for supplying coating to the channel in the end, a stationary plate having an opening therethrough with the edge of its opening shaped to form a control cam, a slide carried by said head on which said nozzle is mounted, a roller carried by said slide and contacting with said control cam, springs moving said slide for holding the roller in contact with said cam, and a valve control means for regulating the discharge of the coating material from the nozzle.

6. A machine for coating the channel of irregularly shaped can ends comprising a non-rotating can end support, a rotating head located above said support including a sleeve mounted in suitable bearings for rotation in a non-rotating sleeve, a radially moving slide carried by said rotating head, a nozzle mounted on said slide for supplying coating material to the channel in the end, a stationary control cam operating to position said nozzle over the channel during the entire rotation of the head, means for rotating said head, and means whereby the non-rotating sleeve may be moved in the supporting frame therefor for rendering the parts accessible for cleaning.

7. A machine for coating the channel of irregularly shaped can ends comprising a non-rotating can end support, a rotating head located above said support, a nozzle supported by said head for supplying coating to the channel in the end, a slide carried by the rotating head and movable radially thereof on which said nozzle is mounted, a control cam associated therewith for positioning the nozzle over the channel during the entire rotation of the head, and means for controlling the discharge of the coating material from said nozzle including a control plate, a needle valve, and lever connected thereto and bearing on said control plate, and a control cam operating in time with the rotating cam for shifting the position of said control plate.

8. A machine for coating the channel of irregularly shaped can ends comprising a non-rotating can end support, a rotating head located above said support, a nozzle supported by said head for supplying coating to the channel in the end, a slide carried by the rotating head and movable radially thereof on which said nozzle is mounted, a control cam associated therewith for positioning the nozzle over the channel during the entire rotation of the head, means for controlling the discharge of the coating material from said nozzle including a control plate rotating with said head and movable axially thereof, a needle valve for controlling the nozzle, a lever connected to the needle valve and bearing on said plate, a second control cam rotated from said head, and a lever bearing on the second control cam and connected to said plate for shifting the plate.

JOHN COYLE.